(12) United States Patent
Hapyuk et al.

(10) Patent No.: US 8,424,892 B2
(45) Date of Patent: Apr. 23, 2013

(54) SYSTEM AND METHOD FOR DETERMINING WHETHER THE WEIGHT OF A VEHICLE EQUIPPED WITH AN AIR-RIDE SUSPENSION EXCEEDS PREDETERMINED ROADWAY WEIGHT LIMITATIONS

(75) Inventors: Andriy Hapyuk, North Royalton, OH (US); Kostyantyn Zavatskyy, Parma, OH (US)

(73) Assignee: Andriy Hapyuk, North Royalton, OH (US)

( * ) Notice: Subject to any disclaimer, the term of this patent is extended or adjusted under 35 U.S.C. 154(b) by 173 days.

(21) Appl. No.: 12/871,954

(22) Filed: Aug. 31, 2010

(65) Prior Publication Data
US 2011/0049837 A1      Mar. 3, 2011

Related U.S. Application Data

(60) Provisional application No. 61/238,260, filed on Aug. 31, 2009.

(51) Int. Cl.
*B62D 53/06*      (2006.01)

(52) U.S. Cl.
USPC .................................... 280/149.2; 177/136

(58) Field of Classification Search .............. 280/149.2; 180/209, 24.01; 177/136
See application file for complete search history.

(56) References Cited

U.S. PATENT DOCUMENTS

| | | | |
|---|---|---|---|
| 4,854,407 A | 8/1989 | Wagner | |
| 6,564,834 B2 * | 5/2003 | Burian et al. | 141/286 |
| 6,921,100 B2 | 7/2005 | Mantini et al. | |
| 7,240,911 B1 | 7/2007 | Escalante | |
| 2007/0017715 A1 | 1/2007 | McCann | |

* cited by examiner

*Primary Examiner* — Eric Culbreth
(74) *Attorney, Agent, or Firm* — Rankin, Hill & Clark LLP

(57) ABSTRACT

A system and method for determining whether a vehicle and its axles exceed predetermined roadway weight limitations. Air fittings are installed in the air-ride systems of the vehicle. Air pressure readings taken using a hand held gauge are compared to maximum pressure values marked on the vehicle. If the air pressure exceeds the values, weight may be redistributed, if possible, until measured pressure is equal to or less than the maximum pressure values. The method allows an operator to quickly confirm that the total weight and axle weight does not exceed legal limits without the use of truck scales.

18 Claims, 4 Drawing Sheets

CALIBRATION PROCESS

INSTALL AT LEAST ONE AIR FITTING IN AN ISOLATED PORTION OF AN AIR RIDE SUSPENSION SYSTEM OF A VEHICLE THAT INCLUDES AT LEAST ONE AIR BAG ASSOCIATED WITH AN AXLE

↓

MEASURE THE AIR PRESSURE IN THE AIR RIDE SUSPENSION SYSTEM USING THE AIR FITTING AND A HAND-HELD GAUGE WHEN THE WEIGHT ON THE AXLE IS AT THE MAXIMUM PREDETERMINED LEGAL ROADWAY LIMIT AND MARKING THE CALIBRATED MAXIMUM AIR PRESSURE ON THE VEHICLE

↓

IF THE VEHICLE INCLUDES A ROAD TRACTOR AND A SEMI-TRAILER COUPLED TO THE ROAD TRACTOR AT A FIFTH WHEEL AND THE ROAD TRACTOR DOES NOT HAVE AN AIR RIDE SUSPENSION FOR THE STEERING AXLE, WITH A FULL FUEL LOAD, POSITION THE FIFTH WHEEL AND TRAILER AXLE SUCH THAT THE WEIGHT ON EACH OF THE TRAILER AXLE AND THE DRIVE AXLE IS AT THE PREDETERMINED LEGAL ROADWAY LIMIT AND VERIFY THAT THE WEIGHT OF THE ENTIRE VEHICLE DOES NOT EXCEED THE PREDETERMINED LEGAL ROADWAY LIMIT, THEN MARK THE "CRITICAL" POSITION OF THE FIFTH WHEEL AND THE WEIGHT "M" ON THE VEHICLE, "M" BEING THE MAXIMUM PREDETERMINED LEGAL ROADWAY LIMIT FOR THE ENTIRE VEHICLE LESS THE MAXIMUM PREDETERMINED LEGAL ROADWAY LIMIT FOR EACH OF THE DRIVE AXLE AND THE TRAILER AXLE

*Fig. 3*

SYSTEM AND METHOD FOR DETERMINING WHETHER THE WEIGHT OF A VEHICLE EQUIPPED WITH AN AIR-RIDE SUSPENSION EXCEEDS PREDETERMINED ROADWAY WEIGHT LIMITATIONS

BACKGROUND OF INVENTION

1. Field of Invention

The present invention relates to road haulage and, more particularly, to a system and method for determining whether the weight of a vehicle exceeds predetermined roadway weight limitations.

2. Description of Related Art

A semi-trailer is a trailer without a front axle, which is adapted to be coupled to and towed by a road tractor (also known as a "semi-truck" or simply a "truck"). A semi-trailer does not trail completely behind the road tractor. It is coupled to the road tractor at a point that is forward of the rear-most axle of the road tractor such that a portion of the weight of the trailer is carried by the rear axle(s) of the road tractor.

In North America, road tractors typically include three axles, namely: a front "steer" axle having two wheels; and a pair of rear "drive" axles, each having a pair of double wheels ("dualies") on each side. Due to their relatively close proximity to each other, the pair of rear drive axles is generally considered as a single axle for purposes of roadway weight limit calculations. Other configurations are known.

In North America, the semi-trailer typically includes two "tandem" axles at the rear, each of which has dual wheels. However, semi-trailers having only one axle and/or only pairs of single wheels are also known. Again, due to their relatively close proximity to each other, the pair of tandem axles is generally considered as a single axle (sometimes referred to herein as the "trailer axle") for purposes of roadway weight limit calculations. The combination of a road tractor and semi-trailer is sometimes referred to as an "eighteen wheeler" because the road tractor typically has ten wheels and the semi-trailer typically has eight wheels.

The semi-trailer is coupled to the road tractor by means of a coupling pin (also known as a "king pin") on the front of the semi-trailer, which engages with a horseshoe-shaped coupling device called a fifth wheel, which is mounted proximal to the rear of the road tractor. The fifth wheel is slidably supported by the frame of the road tractor, and can be repositioned relative to the frame of the road tractor to adjust the weight distributed on the drive axles of the road tractor. Similarly, the tandem axle(s) on the semi-trailer are slidably supported relative to the frame of the semi-trailer and can be repositioned to adjust the weight distributed thereon and also to adjust the weight distributed to the drive axles. As noted below, the ability to accurately make such adjustments is important because the weight placed on each axle must not exceed predetermined legal roadway weight limits otherwise a fine can be imposed.

When the tandem axles on the semi-trailer are moved forward (i.e., closer to the truck) weight is shifted from the drive axles of the road tractor to the tandem axles on the semi-trailer (i.e., the tandem axle load weight becomes heavier and the road tractor drive axle weight becomes lighter). Conversely, when the tandem axles on the semi-trailer are moved backward (i.e., away from the road tractor) weight is shifted from the semi-trailer to the road tractor (i.e., the semi-trailer tandem axle load weight becomes lighter and the road tractor drive axle weight becomes heavier). When the fifth wheel is moved forward, a greater amount of weight is placed on the "steer" axle of the road tractor. When the fifth wheel is moved rearward, a lesser amount of weight is placed on the "steer" axle of the road tractor.

These adjustments are performed by the operator of the road tractor after the semi-trailer is coupled to the road tractor. Conventionally, the operator repositions the fifth wheel and tandem axles based on experience and operates the road tractor and semi-trailer until such time as the operator can obtain axle weight measurements using truck scales and make adjustments, if necessary. The lack of an ability to confirm whether the total weight of the vehicle (i.e., the combination of the road tractor and the semi-trailer) and the weight on the axles is within the legal roadway weight limits places the operator at risk of being outside the legal roadway weight limits until such time as the operator can reach the truck scales. Furthermore, the operator's time is consumed while waiting to use the truck scales, which is costly.

The prior art discloses a variety of complicated systems that are intended to assist an operator in repositioning the fifth wheel and/or the tandem axles on the semi-trailer to insure that the weight distributed to each axle does not exceed predetermined roadway weight limitations. These prior art systems, which often involve complex mechanical and/or electronic devices, have not found wide acceptance in the trucking industry ostensibly due to cost, performance and/or reliability issues. A simple system and method is needed for determining whether the axles of a road tractor and a loaded semi-trailer coupled thereto exceed predetermined roadway weight limitations.

BRIEF SUMMARY OF THE INVENTION

In view of the foregoing, the present invention is directed toward a system and method for determining whether the total weight of a vehicle equipped with an air ride suspension, and each of its axles, exceeds predetermined roadway weight limitations. The present invention does not require the installation of expensive, complicated electronic components, which are prone to failure. But rather, it requires the installation of conventional air fittings in the air ride suspension system of the vehicle, and utilizes a hand-held air pressure gauge, which the operator can couple to the air fittings to take pressure measurements in the air ride suspension system. Based on the air pressure measurements and prior calibration, the operator can quickly and accurately determine whether the total weight of the vehicle and the weight on the axles exceed predetermined legal roadway weight limits. If the pressure is below the calibrated maximums, the operator can proceed with confidence that the weight is within legal limits. If the pressure exceeds the calibrated maximums, the operator can reposition the axles to redistribute the weight or reduce the load and recheck the pressures after the adjustment has been made.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIG. 3 is a flow chart showing calibration process steps used in the method of the invention.

DETAILED DESCRIPTION OF THE INVENTION

Figure 1:
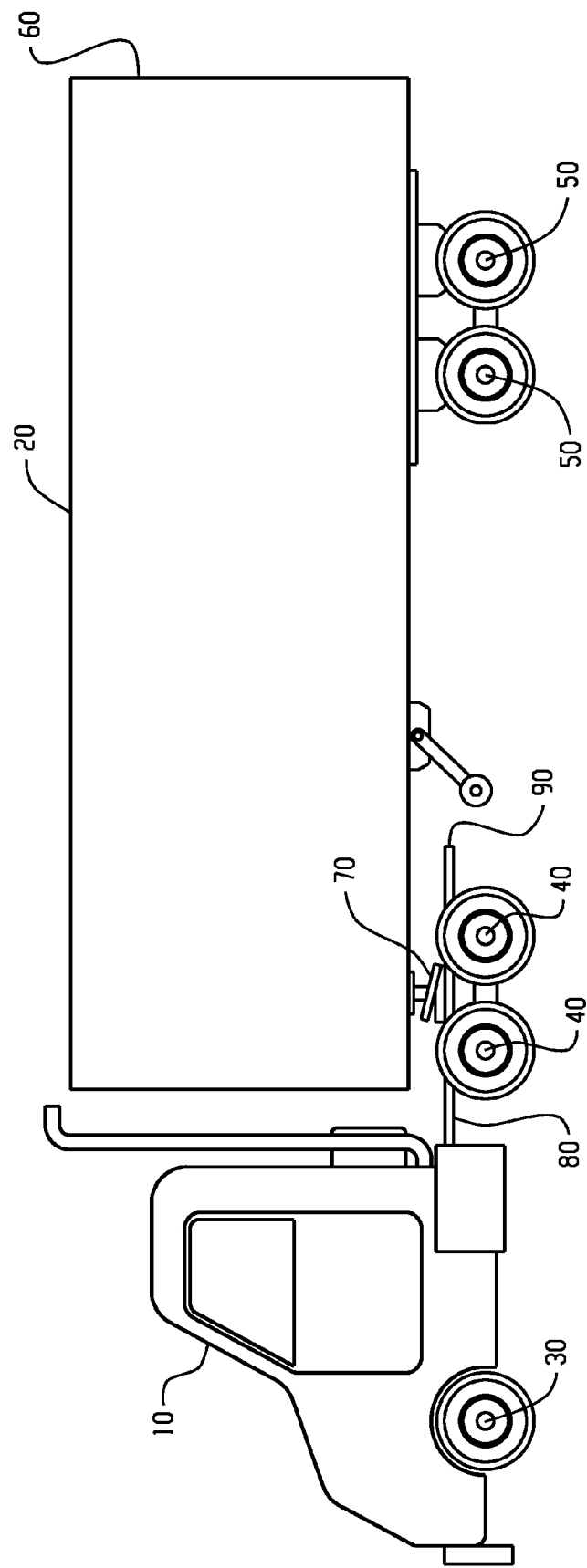
FIG. 1 is a schematic side view of a road tractor and semi-trailer of the type on which a system and method of the invention can be utilized.
Figure 2:
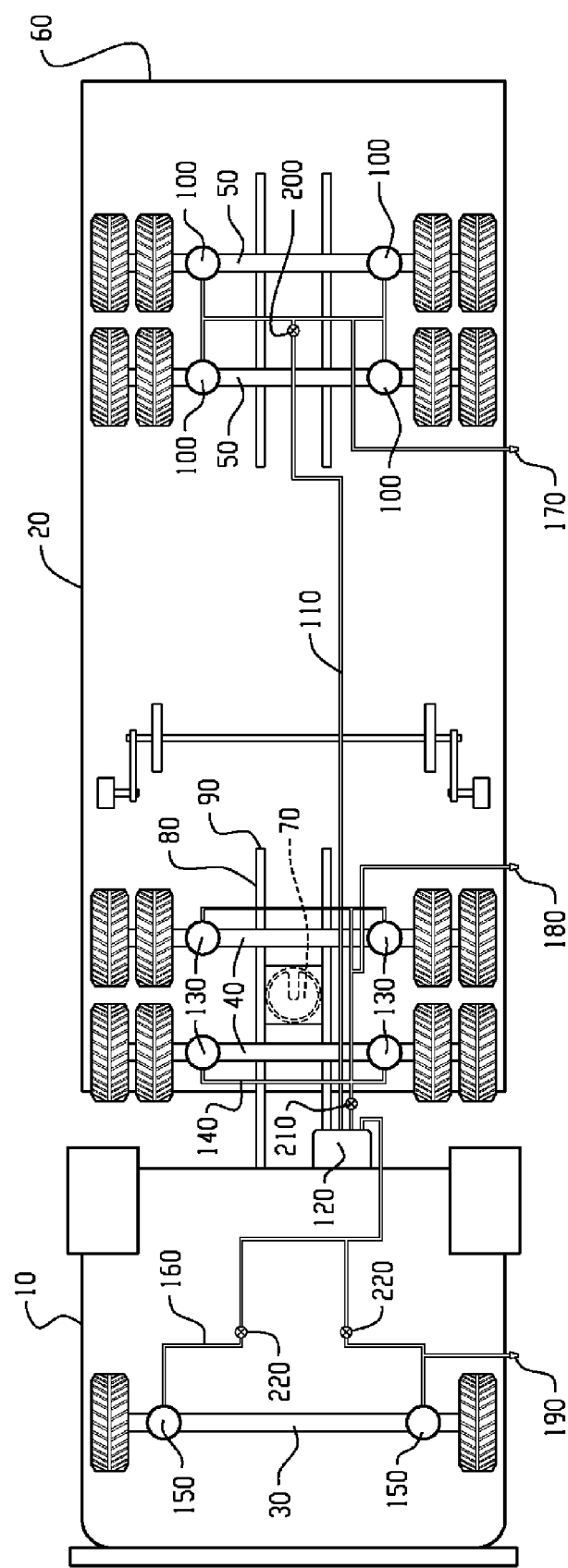
FIG. 2 is a schematic bottom plan view of the road tractor and semi-trailer of FIG. 1 showing the axle groups, air ride suspension system components and air fittings.

FIGS. 1 and 2 schematically illustrate an exemplary road tractor 10 having a semi-trailer 20 coupled thereto. The road tractor 10 includes a steer axle 30 and a drive axle 40. In the illustrated embodiment, two rear axles collectively comprise the drive axle 40. A road tractor 10 and semi-trailer 20 are used in the illustrations because this is a common vehicle type used to haul freight in North America. It will be appreciated that the system and method of the invention could be utilized with other vehicle configurations.

The semi-trailer 20 includes a trailer axle 50. In the illustrated embodiment, the trailer axle 50 comprises a tandem or pair of axles. It will be appreciated that other arrangements and numbers of axles or groups of axles could be utilized in accordance with the present invention. In the illustrated embodiment, the trailer axle 50 is adjustable forward or back relative to the rear 60 of trailer 20 to redistribute weight on the axles.

The steer axle 30 and the drive axle 40 of the road tractor 10 are fixed relative to each other. However, the road tractor 10 includes a fifth wheel 70, which is adapted to be slidably adjustable on the frame 80 of the road tractor 10 forward or back relative to the rear 90 of the road tractor 10. By moving the trailer axle 50 and/or the fifth wheel 70, weight can be redistributed between the trailer axle 50, the drive axle 40 and the steer axle 30.

With reference to FIG. 2, the trailer 20 includes an air-ride suspension that includes air bags 100. The air bags 100 are supplied with air through a line 110, which extends from an air reservoir or tank 120 mounted to the road tractor 10. The air-ride suspension typically includes an air leveler, which is known in the art. The air bags 100 are interconnected together and isolated from the line 110 using a valve 200.

The road tractor 10 also includes an air-ride suspension. Sometimes, the air-ride suspension only includes air bags 130 for the drive axle 40, which are supplied with air through a line 140 that extends from the tank 120. But in other cases, the air-ride suspension further comprises air bags 150 for the steer axle 30, which are supplied with air through a line 160 that extends from the tank 120. The air bags 130 are interconnected together and isolated from the line 140 using a valve 210. And, the air bags 150 are usually not connected together, but rather each (left and right) is isolated from the line 160 using a valve 220.

In accordance with the invention, at least one air fitting is installed in an isolated portion of the air-ride suspension system of the vehicle that includes an air bag. In the case of a trailer 20, the isolated portion includes air bags 100. Preferably, at least a second air fitting 180 is installed in the isolated portion of the air-ride suspension system for the road tractor 10 that includes the air bags 130. Optionally, an additional air fitting 190 can be installed in the isolated portion of the air-ride suspension system for the road tractor 10 that includes an air bag 150. In the illustrated embodiment shown in FIG. 2, only one air fitting 190 is installed. It will be appreciated that an air fitting could be installed in both the left and the right isolated portions of the road tractor 20 containing air bags 150.

The air fittings 170, 180, 190 are preferably Schrader valves, which are well known in the art. But other types of air fittings can be utilized, if desired. The air fittings 170, 180, 190 are preferably installed on the operator's side of the road tractor 10 in a location that is easily accessible to the operator while the operator is standing on the ground next to the road tractor and semi-trailer. The air fittings 170, 180, 190 permit the operator to accurately and quickly measure the air pressure in each of the isolated portions of the air-ride suspensions, which contain air bags 100, 130, and optionally 150, respectively, using a hand-held air gauge.

Figure 4:
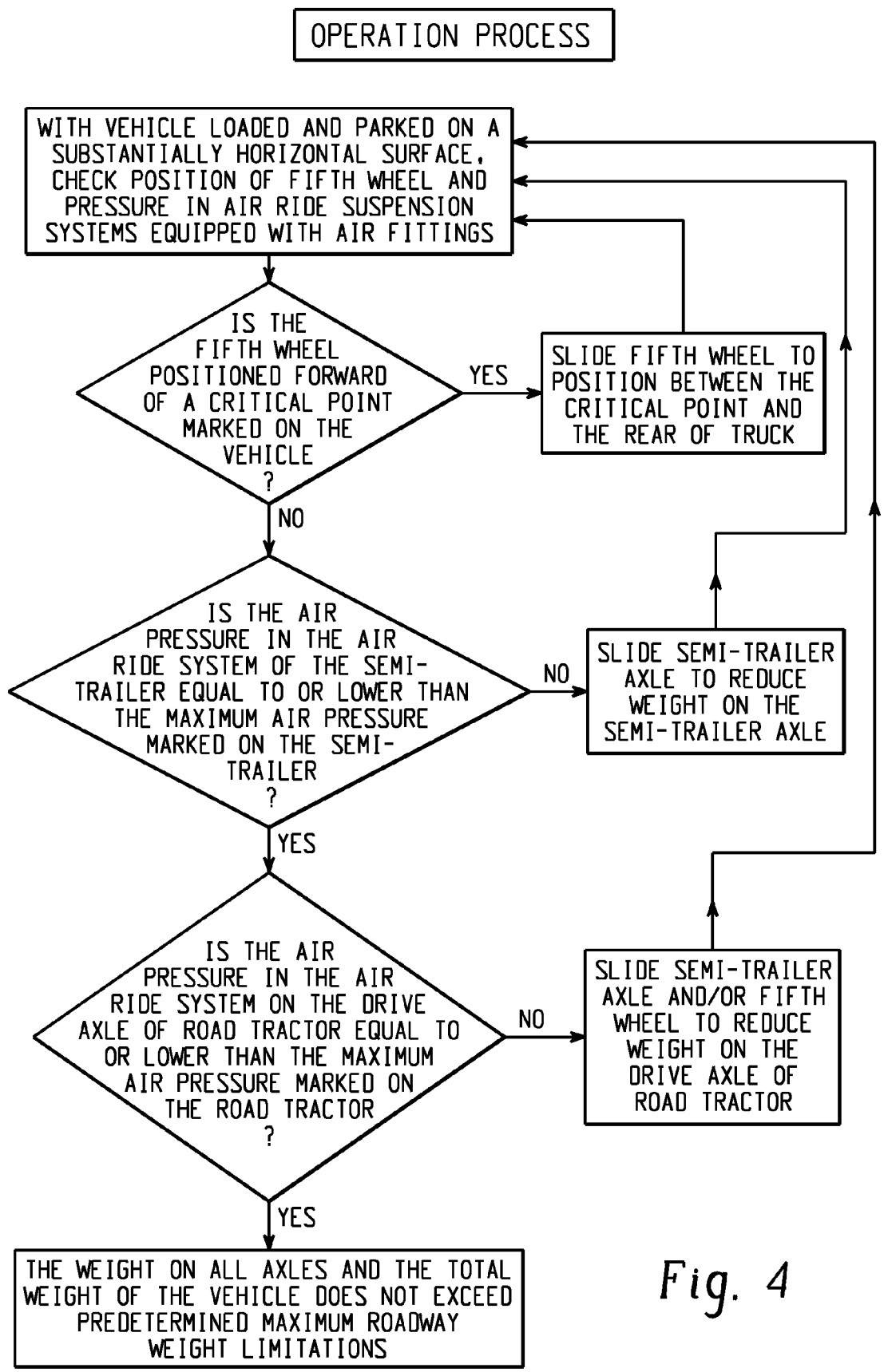
FIG. 4 is a flow chart showing operation process steps used in the method of the invention.

FIG. 3 generally illustrates calibration steps used in the method of the invention and FIG. 4 generally illustrates operation steps used in the method of the invention. It will be appreciated that the maximum air pressure must be calibrated for the vehicle before the operation steps can be performed. The calibration and operation of the system and method is explained in greater detail below.

The calibration process comprises installing at least one air fitting into an isolated portion of the air-ride suspension of the vehicle. In the embodiment of the invention illustrated in FIG. 2, an air fitting 180 has been installed in the air-ride system of a road tractor 10 and an air fitting 170 has been installed in the air-ride system of a semi-trailer 20 that is coupled to the road tractor 10. Additional air fittings (e.g., air fitting 190 installed in the steer axle of the road tractor 10) can be installed, if possible or desired. This can be accomplished easily and inexpensively using Schrader valves and air lines, as described above.

Once the air fittings have been installed, an appropriately loaded road tractor and semi-trailer combination are taken to a set of truck scales. An appropriately loaded road tractor should have a full fuel load, and the combination of the road tractor and loaded trailer should not exceed but be near the predetermined legal roadway weight limit for such vehicles (e.g., 80,000 lbs). To get the most accurate calibration measurements, the weight in the road tractor should also take into account the weight that would typically be present in the road tractor during use (e.g., the weight of occupants and their personal gear). If the operator of the vehicle will typically be making the measurements in the operation portion of the method, this amount of weight (e.g., 250 lbs) should be removed from the road tractor to account for the operator not being present in the road tractor when the pressure measurements are being taken. As noted, the total weight of the road tractor and semi-trailer combination should be the maximum permitted for the roadway on which the vehicle will travel.

In the calibration process for a vehicle comprising a road tractor and semi-trailer, the trailer axles 50 are moved forward or backward relative to the trailer 20, as required, to distribute the predetermined maximum legal roadway weight on the trailer axle 50, as measured by the truck scale. The predetermined maximum legal roadway weight will vary depending upon the type of roads on which, and the jurisdictions through which, the road tractor and semi-trailer will travel. In the United States, it is common for the maximum predetermined weight for a vehicle comprising a road tractor and a loaded semi-trailer to be 80,000 pounds, with a maximum of 34,000 pounds being permitted to be distributed over the trailer axle and the drive axle, respectively. The amount of weight that can be distributed over the steer axle in such a vehicle varies, but a maximum of approximately 20,000 pounds is somewhat common.

During the calibration process, an air pressure measurement is taken in the air-ride suspension containing bags 100 using a hand-held air pressure gauge, and the air pressure measurement is then marked on the semi-trailer, preferably near the air fitting 170. The maximum weight utilized to obtain that air pressure measurement is also preferably recorded on the semi-trailer. Any recording means can be used (e.g., stickers, labels, paint etc.).

Next, the trailer axle 50 and/or the fifth wheel 70 is moved forward or backward as required to distribute a predetermined maximum legal roadway weight on the drive axle 40 of the road tractor 10 as measured by the truck scale and a weight "M" on the steer axle 30, where "M" is equal to the difference between the predetermined maximum legal roadway weight for the entire vehicle (e.g., the sum of the road tractor plus the loaded semi-trailer) less the sum of the predetermined maximum legal roadway weight for the drive axle and the predetermined maximum legal roadway weight for the trailer axle. The weight "M" may be less than the maximum predetermined legal roadway weight limit for a steer axle. For example, if the maximum predetermined legal roadway weight limit for the trailer axle and the drive axle was 34,000 pounds, and the maximum predetermined legal roadway weight limit for the steer axle was 20,000 pounds and the maximum predetermined legal roadway weight limit for the entire vehicle was 80,000 pounds, the weight "M" would be 12,000 pounds (80,000 pounds less 34,000 pounds for the trailer axle and 34,000 for the drive axle). "M" would thus be less than the 20,000 pound maximum predetermined legal roadway weight limit for the steer axle in that situation. It will be appreciated that it may be necessary to reposition the trailer axle 50 to get the predetermined maximum legal roadway weight on the drive axle 40 of the road tractor. Once the weight has been properly distributed on both axles, an air pressure measurement is then taken in the isolated portion of the air-ride suspension containing bags 130 using the hand-held air pressure gauge, and the air pressure measurement is then marked on the road tractor 10, preferably near the air fitting 180. The position of the fifth wheel is also recorded, preferably together with the amount of weight used to produce the pressure reading. If the steer axle 30 is supported by an air ride suspension, an air pressure measurement is taken at air fitting 190 using a hand-held air pressure gauge and marked on the road tractor 10, preferably near the air fitting(s) 190. The value of "M" is also preferably marked on the road tractor.

The position of the fifth wheel is marked in the calibration step because it represents a "critical point" beyond which the weight on the steer axle may cause the total vehicle weight to exceed roadway limitations. For example, if the fifth wheel is moved forward of the critical point, it may be possible that the weight on the trailer axle and the drive axle may be within legal roadway weight limits, but the total vehicle weight could exceed the maximum permitted. But if the fifth wheel is not moved beyond the critical point, it is not possible for the total vehicle weight to exceed the roadway limitations.

It will be appreciated that the calibration steps must be completed at least once before the operation steps can be performed. The calibration steps need not necessarily be performed on each road tractor and/or trailer (or other vehicle), as vehicles equipped with similar equipment can be assumed to have the same calibration values. Accordingly, a fleet of similar trucks and/or trailers can be marked with the same calibration information obtained from measurements taken on one or just a few trucks and/or trailers. It will be appreciated that manufacturers of road tractors and trailers could apply the calibration data to the vehicles at the time of manufacture. Similar trucks and similar trailers equipped with the same systems should have the same calibration data and critical data points, meaning that actual calibration of particular equipment may not be required. It may be possible to calibrate the air pressure in the air ride suspension system and/or the critical position of fifth wheel using other methods.

Once the calibration steps have been performed, the operation steps shown in FIG. 4 can be performed. First, a load is obtained for the vehicle. In the case of a road tractor and semi-trailer, the load is placed on the semi-trailer and the semi-trailer and road tractor are taken to a substantially horizontal surface. The position of the fifth wheel is checked to make sure that it is not forward of the critical position determined in the calibration process. If it is, then the fifth wheel is positioned at or to the rear of the critical position.

Next, the air pressure in the air-ride suspension system(s) of the semi-trailer and road tractor are measured using a hand-held air pressure gauge at the fittings installed in the isolated portions. This is preferably done on the semi-trailer first, but the order in which the measurements are taken is not per se critical. If the air pressure measured in the isolated portion of the air ride suspension system of the semi-trailer that contains the bags associated with the trailer axle is greater than the maximum pressure marked on the trailer in the calibration process, the trailer axle should be moved to reduce the weight on the trailer axle. If the air pressure measured in the isolated portion of the air ride suspension system of the semi-trailer that contains the bags associated with the trailer axle is less than the maximum pressure marked on the trailer in the calibration process, the air pressure is then measured in the isolated portion of the air ride suspension system of the road-tractor that contains the bags associated with the drive axle. If the air pressure measured in the isolated portion of the air ride suspension system of the road tractor that contains the bags associated with the drive axle is greater than the maximum pressure marked on the road tractor in the calibration process, the trailer axle and/or the fifth wheel should be moved to reduce the weight on the drive axle. It is preferable that the trailer axle be repositioned before the fifth wheel is repositioned. This may not be possible if the trailer axle had to be repositioned in order to reduce the weight on the trailer axle. The fifth wheel should not be repositioned beyond the critical point marked on the road tractor in the calibration process.

If the steer axle is equipped with an air-ride system, a measurement is taken of the air pressure in the isolated portion of the air-ride suspension system that includes a bag associated with the steer axle. Again, the air pressure measurement is taken by coupling a hand held gauge to the air fitting installed in the isolated portion of the air-ride suspension of the road tractor that includes a bag associated with the steer axle.

Once the air pressure measured in both the isolated portion of the air ride suspension system of the semi-trailer that contains the bags associated with the trailer axle and the isolated portion of the air ride suspension system of the road tractor that contains the bags associated with the drive axle is less than the maximum pressure marked on the semi-trailer and road tractor in the calibration process, and the fifth wheel is not forward of the critical point, the operator can be assured that the weight on each axle does not exceed the predetermined maximum legal weight limit for the roadway, and the total vehicle weight does not exceed the predetermined maximum legal weight limit for the roadway.

The measurements during calibration and operation are preferably taken by the operator of the road tractor. Preferably, there is no occupant in the road tractor when the calibration measurement is made (i.e., the calibration measurements account for the absence of the operator in the vehicle, who is taking the measurements), because this will replicate the conditions when an operator picks up a load from a customer. But the measurements can be taken by someone on behalf of the operator.

It will be appreciated that the system and method according to the invention could be used with vehicles other than a road tractor and semi-trailer combination. For example, an air fitting could be installed in a "straight" truck having rear axle supported by an air ride suspension system. During calibration, the air pressure in the isolated portion of the air ride suspension system would be determined and marked on the straight truck. The calibration step identifies the air pressure that correlates with the maximum weight permissible on the fixed axles. If this pressure is exceeded, a portion of the load must be moved within the vehicle or removed from the vehicle in order not to exceed the predetermined legal maximum weight limitations for the axles and the vehicle. A second fitting could be installed in the air ride suspension system of the front "steer" axle of the truck, which if calibrated properly would allow the operator to confirm that the weight on the axle does not exceed the predetermined legal maximum weight limit for the axle and for the entire vehicle.

The principles of the method and system of the invention also apply to multiple trailer vehicles (e.g., doubles and triples). In such an application, the trailer axle(s) could be repositioned (or the load on the trailer repositioned or reduced) until the air pressure measured using a hand held gauge was less than the maximum pressure marked on the trailer.

Thus, the present invention allows an operator or someone on the operator's behalf to quickly, accurately and easily confirm that the weight distributed over each axle of the vehicle and the total weight of the vehicle does not exceed the predetermined legal roadway limits. This is accomplished without the need for complicated electro-mechanical devices and the use of truck scales. Furthermore, it is very inexpensive and technically uncomplicated to modify road tractors and semi-trailers such that they can be used in accordance with the invention. Fleet operators can inexpensively equip the entire fleet of semi-trailers and road tractors with fittings as described at little cost and avoid payment of fines and incurring delays caused by loads that exceed the legal limits.

Additional advantages and modifications will readily occur to those skilled in the art. Therefore, the invention in its broader aspects is not limited to the specific details shown and described herein. Accordingly, various modifications may be made without departing from the spirit or scope of the general inventive concept as defined by the appended claims and their equivalents.

What is claimed is:

1. A method for determining whether a load-bearing vehicle equipped with an air ride suspension system exceeds predetermined roadway weight limitations, said vehicle including a road tractor and a semi-trailer coupled to the road tractor, said road tractor including a steer axle and a drive axle, and said semi-trailer including a trailer axle, the method comprising:
measuring a trailer axle air pressure using a hand-held gauge and an air fitting installed in an isolated portion of the air ride suspension system that includes at least one bag associated with the trailer axle of the vehicle;
comparing the measured trailer axle air pressure with a calibrated maximum trailer axle air pressure; and
reducing the weight on the trailer axle until the measured trailer axle air pressure is less than the calibrated maximum trailer axle air pressure.

2. The method according to claim 1 wherein the reducing step is accomplished by removing a portion of the load from the vehicle.

3. The method according to claim 1 wherein the trailer axle is repositionable.

4. The method according to claim 3 wherein the reducing step is accomplished by repositioning the trailer axle.

5. The method according to claim 1 further comprising:
measuring a drive axle air pressure using the hand-held gauge and a second air fitting installed in an isolated portion of the air ride suspension system that includes at least one bag associated with the drive axle of the road tractor;
comparing the measured drive axle air pressure with a calibrated drive axle maximum air pressure; and
reducing the weight on the drive axle until the measured drive axle air pressure is less than the calibrated drive axle maximum air pressure.

6. The method according to claim 5, wherein the reducing the weight on the drive axle step is accomplished by repositioning a fifth wheel relative to a frame of the road tractor.

7. A method comprising:
providing a semi-trailer having a king pin, a repositionable trailer axle and a semi-trailer air-ride suspension system, wherein said semi-trailer air-ride suspension system includes a trailer axle isolated portion comprising air bags associated with the trailer axle and an air fitting in communication with said trailer axle isolated portion;
providing a road tractor having a repositionable fifth wheel, a steer axle, a drive axle and an air-ride suspension system, wherein said road tractor air-ride suspension system includes a drive axle isolated portion comprising air bags associated with the drive axle and an air fitting in communication with said drive axle isolated portion;
engaging a hand held gauge with said air fitting in communication with said trailer axle isolated portion when the king pin of the semi-trailer is coupled to the fifth wheel of the road tractor and the semi-trailer is supporting a load to obtain a measured trailer axle pressure;
comparing the measured trailer axle pressure with a maximum trailer axle pressure marked on the semi-trailer, said maximum trailer axle pressure being a value obtained by measuring the pressure in said trailer axle isolated portion when said trailer axle is supporting a predetermined maximum legal roadway trailer axle weight limit, and, if the measured trailer axle pressure exceeds the maximum trailer axle pressure marked on the semi-trailer, repositioning the trailer axle until the measured trailer axle pressure obtained by engaging the hand held gauge with said air fitting in communication with said trailer axle isolated portion is equal to or less than said maximum trailer axle pressure marked on the semi-trailer;
engaging the hand held gauge with said air fitting in communication with said drive axle isolated portion when the king pin of the semi-trailer is coupled to the fifth wheel of the road tractor and the semi-trailer is supporting the load to obtain a measured drive axle pressure; and
comparing the measured drive axle pressure with a maximum drive axle pressure marked on the road tractor, said maximum drive axle pressure being a value obtained by measuring the pressure in said drive axle isolated portion when said drive axle is supporting a predetermined maximum legal roadway drive axle weight limit, and, if the measured drive axle pressure exceeds the maximum drive axle pressure marked on the road tractor, repositioning the fifth wheel until the measured drive axle pressure obtained by engaging the hand held gauge with said air fitting in communication with said drive axle isolated portion is equal to or less than said maximum drive axle pressure marked on the road tractor.

8. The method according to claim 7 wherein the fifth wheel is not repositioned forward of a critical point marked on the road tractor, said critical point being the position of the fifth wheel when the predetermined maximum legal roadway trailer axle weight limit is supported by the trailer axle and the predetermined maximum legal roadway drive axle weight limit is supported by the drive axle and a total vehicle weight does not exceed a predetermined maximum legal weight for said vehicle.

9. The method according to claim 7 wherein the air-ride suspension of said road tractor further comprises a steer axle isolated portion comprising air bags associated with the steer axle and an air fitting in communication with said steer axle isolated portion, and wherein said method further comprises:
    engaging the hand held gauge with said air fitting in communication with said steer axle isolated portion when the king pin of the semi-trailer is coupled to the fifth wheel of the road tractor and the semi-trailer is supporting the load to obtain a measured steer axle pressure; and
    comparing the measured steer axle pressure with a maximum steer axle pressure marked on the road tractor, said maximum steer axle pressure being a value obtained by measuring the pressure in said steer axle isolated portion when said steer axle is supporting a predetermined maximum legal roadway steer axle weight limit, and, if the measured steer axle pressure exceeds the maximum steer axle pressure marked on the road tractor, repositioning the fifth wheel until the measured steer axle pressure obtained by engaging the hand held gauge with said air fitting in communication with said steer axle isolated portion is equal to or less than said maximum steer axle pressure marked on the road tractor.

10. The method according to claim 9 wherein the air fitting in communication with said steer axle isolated portion is a Schrader valve.

11. The method according to claim 7 wherein the air fitting in communication with said trailer axle isolated portion is a Schrader valve.

12. The method according to claim 7 wherein the air fitting in communication with said drive axle isolated portion is a Schrader valve.

13. The method according to claim 7 wherein the trailer axle comprises a group of two axles proximal to each other and the tractor axle isolated portion comprises four air bags.

14. The method according to claim 7 wherein the drive axle comprises a group of two axles proximal to each other and the drive axle isolated portion comprises four air bags.

15. The method according to claim 7 further comprising hauling said semi-trailer using said road tractor on the roadway without first verifying that the weight on said trailer axle is equal to or less than the predetermined maximum legal roadway trailer axle weight limit using truck scales, and without first verifying that the weight on said drive axle is equal to or less than the predetermined maximum legal roadway drive axle weight limit using truck scales.

16. A system for determining whether the weight of a vehicle equipped with an air ride suspension system exceeds predetermined roadway weight limitations, the system comprising:
    an air fitting adapted to engage with a hand-held gauge, said air fitting being installed in an isolated portion of the air ride suspension system that includes at least one bag associated with an axle of the vehicle; and
    a calibrated maximum air pressure marked on the vehicle, said calibrated maximum air pressure being the air pressure in the air ride suspension system as would be measured at the fitting using the hand-held gauge in the event that a predetermined maximum roadway axle weight limit was placed on the axle.

17. The system according to claim 16, wherein the vehicle comprises:
    a semi-trailer having a king pin and a repositionable trailer axle, wherein said isolated portion of the air ride suspension system is a semi-trailer air-ride suspension system that includes a trailer axle isolated portion comprising air bags associated with the trailer axle and wherein the air fitting is in communication with said trailer axle isolated portion; and
    a road tractor having a repositionable fifth wheel, a steer axle, a drive axle and an air-ride suspension system, wherein said road tractor air-ride suspension system includes a drive axle isolated portion comprising air bags associated with the drive axle and an air fitting in communication with said drive axle isolated portion;
    wherein said air fitting in communication with said trailer axle isolated portion is adapted to engage with a hand held gauge when the king pin of the semi-trailer is coupled to the fifth wheel of the road tractor and the semi-trailer is supporting a load to obtain a measured trailer axle pressure;
    wherein said air fitting in communication with said drive axle isolated portion is adapted to engage with the hand held gauge when the king pin of the semi-trailer is coupled to the fifth wheel of the road tractor and the semi-trailer is supporting a load to obtain a measured drive axle pressure;
    wherein a maximum trailer axle pressure is marked on the semi-trailer, said maximum trailer axle pressure being a value obtained by measuring the pressure in said trailer axle isolated portion when said trailer axle is supporting a predetermined maximum legal roadway trailer axle weight limit; and
    wherein a maximum drive axle pressure is marked on the road tractor, said maximum drive axle pressure being a value obtained by measuring the pressure in said drive axle isolated portion when said drive axle is supporting a predetermined maximum legal roadway drive axle weight limit.

18. The system according to claim 17, wherein the air-ride suspension of said road tractor further comprises a steer axle isolated portion comprising air bags associated with the steer axle and an air fitting in communication with said steer axle isolated portion, and wherein a maximum steer axle pressure is marked on the road tractor, said maximum steer axle pressure being a value obtained by measuring the pressure in said steer axle isolated portion when said steer axle is supporting a predetermined maximum legal roadway steer axle weight limit.

* * * * *